United States Patent
Hagio et al.

(10) Patent No.: US 11,008,219 B2
(45) Date of Patent: May 18, 2021

(54) ALUMINOPHOSPHATE-BASED ZEOLITE MEMBRANE SYNTHESIS METHOD

(71) Applicant: NGK INSULATORS, LTD., Nagoya (JP)

(72) Inventors: Takeshi Hagio, Inazawa (JP); Kenichi Noda, Nagoya (JP); Makoto Miyahara, Tajimi (JP); Katsuya Shimizu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/572,786

(22) Filed: Sep. 17, 2019

(65) Prior Publication Data
US 2020/0009509 A1 Jan. 9, 2020

Related U.S. Application Data

(63) Continuation of application No. PCT/JP2018/010149, filed on Mar. 15, 2018.

(30) Foreign Application Priority Data

Mar. 31, 2017 (JP) .............................. JP2017-071567

(51) Int. Cl.
C01B 39/54 (2006.01)
B01J 29/83 (2006.01)
B01J 29/85 (2006.01)
B01J 35/06 (2006.01)
B01D 67/00 (2006.01)
B01D 71/02 (2006.01)
B01J 29/50 (2006.01)
B01D 53/94 (2006.01)
C01B 39/30 (2006.01)

(52) U.S. Cl.
CPC .......... C01B 39/54 (2013.01); B01D 67/0051 (2013.01); B01D 71/028 (2013.01); B01J 29/83 (2013.01); B01J 29/85 (2013.01); B01J 35/065 (2013.01); B01D 53/9418 (2013.01); B01J 29/50 (2013.01); C01B 39/305 (2013.01)

(58) Field of Classification Search
CPC ........ C01B 39/54; C01B 39/305; B01J 20/08; B01J 20/18; B01J 20/305; B01J 29/50; B01J 29/83; B01J 29/85; B01J 35/065; B01D 53/8418; B01D 67/0051; B01D 71/028

See application file for complete search history.

(56) References Cited

U.S. PATENT DOCUMENTS 5,756,789 A * 5/1998 Bruce ................... B01J 29/84
502/213
6,153,552 A * 11/2000 Wachter ................. B01J 29/85
502/208
9,700,879 B2 * 7/2017 Schmidt .................. B01J 29/83
2006/0100095 A1 5/2006 Mertens et al.
2009/0114089 A1 5/2009 Liu et al.
2013/0280161 A1 10/2013 Tian et al.
2016/0137518 A1 5/2016 Rivas-Cardona et al.
2017/0291135 A1 10/2017 Noda
2017/0296980 A1 10/2017 Noda
2017/0296983 A1 10/2017 Noda
2017/0348679 A1 12/2017 Naraki

FOREIGN PATENT DOCUMENTS

| CN | 103449475 A | 12/2013 |
|----|-------------|---------|
| JP | 2012-062228 A1 | 3/2012 |
| JP | 2014-506227 A1 | 3/2014 |
| JP | 2016-147801 A1 | 8/2016 |
| JP | 2016-169139 A1 | 9/2016 |
| JP | 2016-204245 A1 | 12/2016 |
| WO | 2016/121887 A1 | 8/2016 |
| WO | 2016/121888 A1 | 8/2016 |
| WO | 2016/121889 A1 | 8/2016 |

OTHER PUBLICATIONS

Newalkar et al, "The effect of gel pH on the crystallization of aluminophosphate molecular sieve AlPO4-5", Zeolites vol. 18, Issue 4, Apr. 1997, pp. 286-290 (Year: 1997).*
Prasad et al,"Roles of Amine Additives and Gel Aging on the Synthesis of AlPO4 Molecular Sieves", Chem. Mater. 1994, 6, 633-635 (Year: 1994).*
English translation of International Preliminary Report on Patentability (Application No. PCT/JP2018/008312) dated Oct. 1, 2019.
Jiaying Li, et al., "Synthesis of NH3-SCR Catalyst SAPO-56 with Different Aluminum Sources," Procedia Engineering, 121 (2015), pp. 967-974.
M. Vilaseca, et al., "AlPO$_4$-18 Synthesized from Colloidal Precursors and its Use for the Preparation of Thin Films," Applied Surface Science, 226 (2004), pp. 1-6.
Emi Mitani et al., "High Functionality of AFX Zeolite by Hydrothermal Conversion Method of FAU Zeolite," Lecture Abstracts of Catalyst Symposium, Mar. 10, 2017, p. 188 (with English translation).
International Search Report and Written Opinion (Application No. PCT/JP2018/008312) dated Apr. 24, 2018.
International Search Report and Written Opinion (Application No. PCT/JP2018/010149) dated May 15, 2018.
English translation of International Preliminary Report on Patentability (Chapter I) (Application No. PCT/JP2018/010149) dated Oct. 10, 2019, 9 pages.

* cited by examiner

Primary Examiner — David M Brunsman
(74) Attorney, Agent, or Firm — Burr & Brown, PLLC

(57) ABSTRACT

A method of synthesis for an aluminophosphate-based zeolite membrane includes a steps of preparing a mixed solution with a pH greater than or equal to 6 and less than or equal to 9 by mixing an acidic phosphorous source with an alkali source, a steps of preparing a starting material solution by adding and mixing an aluminum source to the prepared mixed solution, and a steps of synthesizing an aluminophosphate-based zeolite membrane by hydrothermally synthesizing the starting material solution.

11 Claims, No Drawings

ALUMINOPHOSPHATE-BASED ZEOLITE MEMBRANE SYNTHESIS METHOD

The application is a continuation of PCT/JP2018/010149, filed Mar. 15, 2018.

TECHNICAL FIELD

The present invention relates to an aluminophosphate-based zeolite membrane synthesis method.

BACKGROUND ART

Typically, aluminophosphate-based zeolites are known in relation to use in adsorbing agents, separating agents, catalysts, and catalyst supports, or the like.

An aluminophosphate-based zeolite includes configurations such as an AlPO-based zeolite in which the atoms (T atoms) that are positioned at the center of the oxygen tetrahedron ($TO_4$) that configures the zeolite are aluminum (Al) and phosphorous (P), a SAPO-based zeolite in which the T atoms are Al, P and silicon (Si), a MAPO-based zeolite in which the T atoms are Al, P and magnesium (Mg), and a ZnAPO zeolite in which the T atoms are Al, P and Zinc (Zn).

Non-Patent Literature 1 (Procedia Engineering 121 (2015), p. 967-974, "Synthesis of $NH_3$-SCR Catalyst SAPO-56 with Different Aluminum Sources") discloses a method of synthesis for zeolite crystals having a SAPO-based AFX structure. More specifically, after placing aluminum alkoxide into an (acidic) aqueous solution of phosphoric acid, N,N,N',N'-tetramethyl diaminohexane, that is a structure-directing agent, and colloidal silica as a silicon source are mixed to form a starting material solution and is subjected to hydrothermal synthesis to thereby synthesize a zeolite crystal that has a SAPO-based AFX structure.

Non-Patent Literature 2 (Applied Surface Science, 226 (2004), p. 1-6, "$AlPO_4$-18 synthesized from colloidal precursors and its use for the preparation of thin films") discloses a method of synthesis for a zeolite membrane having an AlPO-based AEI structure.

More specifically, after placing aluminum alkoxide into an (alkali) aqueous solution of tetraethyl ammonium hydroxide as a structure directing agent, a phosphoric acid aqueous solution is dripped and mixed to form a starting material solution and is subjected to hydrothermal synthesis to thereby synthesize a zeolite membrane that has an AlPO-based AEI structure.

SUMMARY

However, the method disclosed in Non-Patent Literature 1 produces aluminum phosphate that exhibits low solubility when the aluminum alkoxide is placed into the phosphoric acid aqueous solution. Consequently, the starting material solution in Non-Patent Literature 1 is not suitable as a starting material solution for a method of membrane synthesis by causing growth of crystals that are attached to a porous support.

Furthermore, the method disclosed in Non-Patent Literature 2 produces aluminum phosphate that exhibits low solubility when phosphoric acid is placed into the aqueous solution of tetraethyl ammonium hydroxide that has dissolved aluminum alkoxide, and therefore is not suitable as a starting material solution for membrane synthesis.

The present invention is proposed in light of the situation described above, and has the object of providing a method of synthesis for an aluminophosphate-based zeolite membrane that enables enhanced characteristics of membrane synthesis.

The synthesis method for an aluminophosphate-based zeolite membrane according to the present invention includes a step of preparing a mixed solution with a pH greater than or equal to 6 and less than or equal to 9 by mixing an acidic phosphorous source with an alkali source, a step of preparing a starting material solution by adding and mixing an aluminum source to the prepared mixed solution, and a step of synthesizing an aluminophosphate-based zeolite membrane by hydrothermally synthesizing the starting material solution.

The present invention enables provision of a method of synthesis for an aluminophosphate-based zeolite membrane that enhances characteristics of membrane synthesis.

DESCRIPTION OF EMBODIMENTS

Method for Manufacturing Aluminophosphate-Based Zeolite Membrane

A method for manufacturing an aluminophosphate-based zeolite membrane according to the present embodiment will be described below.

An aluminophosphate-based zeolite membrane is a membrane that is configured by an aluminophosphate-based zeolite. An aluminophosphate-based zeolite membrane can be used in relation to adsorption membranes, separating membranes, membrane reactors, or the like.

A portion of the T atoms in the oxygen tetrahedron that configures the aluminophosphate-based zeolite may be substituted by other elements.

The zeolite framework is denoted with a structural code (for example, ERI, AFX, AEI, or the like) defining a geometric structure according to the International Zeolite Association.

In the present embodiment, a zeolite is assumed to have only pores that are formed from less than or equal to oxygen 8-membered rings. An oxygen 8-membered ring may simply be referred to as an 8-membered ring, in which the number of oxygen atoms that configure the framework that forms the pore is 8, and is a moiety that forms a ring structure in which the oxygen atoms are bound with the T atoms.

1. Preparation of Mixed Solution

A mixed solution is prepared by mixing a phosphorous source with an alkali source.

The phosphorous source is acidic. There is no particular limitation in relation to a pH as along as the phosphorous source is acidic, and for example, the pH value may be greater than or equal to 1 and less than or equal to 5. Phosphoric acid ($H_3PO_4$) or the like can be used as an acidic phosphorous source. There is no particular limitation in relation to the concentration of the phosphoric acid, and for example, it may be greater than or equal to 30 mass % and less than or equal to 90 mass %.

The alkali source is alkaline. There is no particular limitation in relation to a pH as long as the alkali source is alkaline, and for example, the pH value may be greater than or equal to 9 and less than or equal to 14. An organic amine structure-directing agent can be used as alkali source suitably. The organic amine structure-directing agent includes primary amines, secondary amines, tertiary amines, quaternary ammonium salts such as hydroxides and halides, or the like. More specifically, the structure-directing agent includes N,N,N',N'-tetramethyl diaminohexane, tetramethyl ammonium hydroxide, tetraethyl ammonium hydroxide, or the like, and these compounds may be used in isolation or in combination. It is noted that when the structure-directing agent is neutral, a compound other than a structure-directing agent can be used as the alkali source.

The mixed solution is approximately neutral. In the present embodiment, approximately neutral means that the pH of the mixed solution is greater than or equal to pH 6 and less than or equal to pH 9. The pH of the mixed solution is preferably greater than or equal to pH 6 and less than or equal to pH 8.5.

The mixed solution is prepared by sufficient dissolving and mixing of the phosphorous source and the alkali source in a solvent. The solvent is preferably pure water. Although there is no particular limitation in relation to the temperature of the solvent, it is preferred that the solvent has a low temperature (for example, less than or equal to 10 degrees C.) so that the mixed solution may be heated by the heat of neutralization of the phosphorous source and the alkali source.

When preparing the mixed solution, the whole amount of at least one of the phosphorous source and the alkali source need not be mixed if it is necessary to maintain the approximate neutrality of the mixed solution. That is to say, when a mixed solution that is a mixture of the whole amount of a phosphorous source and the whole amount of an alkali source does not become approximately neutral, it is preferred to adjust the mixing amount of at least one of the phosphorous source and the alkali source so that the mixed solution becomes approximately neutral. The residual amount of the phosphorous source or the alkali source may be mixed after addition of the aluminum source as described below.

2. Preparation of Starting Material Solution

The starting material solution is prepared by adding and mixing an aluminum source into the mixed solution. At that time, since the phosphorous source and the alkali source in the mixed solution are configured to be approximately neutral as discussed above, it is possible to suppress the production of low solubility aluminum phosphate resulting from a reaction between the phosphorous source and the aluminum source. When the aluminum source is acidic, the pH is configured to be less than or equal to 7, and when the aluminum source is neutral or basic, the pH is configured to be greater than or equal to 7. In this manner, it is possible to enhance the suppression of the production of aluminum phosphate due to neutralizing reactions. As a result, since it is possible to suppress gelation of the starting material solution or the production of free floating aluminum phosphate produced in the starting material solution, and therefore membrane formation performance of the aluminophosphate-based zeolite membrane can be enhanced.

The molar ratio of T atoms and pure water as the solvent ($H_2O$/T atoms ratio) is preferably greater than or equal to 30, and more preferably greater than or equal to 50. In this manner, it is possible to suppress nucleation in the starting material solution and to suppress the production of aluminum phosphate resulting from a reaction between the phosphorous source and the aluminum source.

The mixed solution is preferably configured in advance to a low temperature. The temperature of the mixed solution when adding the aluminum source is preferably less than or equal to a temperature at which it is possible to suppress a reaction of the added aluminum source with the phosphorus source in the mixed solution. More specifically, the temperature of the mixed solution is preferably less than or equal to 40 degrees C., more preferably less than or equal to 25 degrees C., and still more preferably less than or equal to 10 degrees C., and particularly preferably less than or equal to 5 degrees C. In this manner, it is possible to further enhance the suppression of the production of aluminum phosphate as a result of a reaction between the phosphorous source and the aluminum source.

Although the mixed solution may be cooled to a desired temperature using cooling equipment, when using ice water as the solvent for the mixed solution as described above, a simple configuration of the period until the ice to melt away enables the mixed solution to be maintained at a temperature of approximately 0 degrees C.

The aluminum source preferably exhibits a tendency to dissolve or diffuse in the mixed solution. More specifically, the aluminum source is preferably aluminum alkoxide, an alumina sol, or an aluminum salt that exhibits solubility per 100 g of mixed solution of greater than or equal to 20 g, and preferably than or equal to 30 g. The aluminum source is most preferably aluminum alkoxide or an alumina sol. Aluminum alkoxide for example includes use of aluminum isopropoxide, or the like, but there is no limitation in this regard. Furthermore, the alumina sol for example includes use of amorphous alumina, γ-alumina, pseudo boehmite, aluminum hydroxide, or the like, but there is no limitation in this regard.

Furthermore, as stated above, when there is a residual portion of the phosphorous source or the alkali source as a result of the mixed solution being configured to be approximately neutral, that residue may be mixed in the starting material solution after completely dissolving the aluminum source.

3. Synthesis of Aluminophosphate-Based Zeolite Membrane

A support for a formation of an aluminophosphate-based zeolite membrane is prepared. The support includes use of a monolithic porous body, a tubular porous body, a flat plate porous body, or the like.

Firstly, zeolite seed crystals or a zeolite having a desired framework is attached to the surface of the support.

Next, the support with the seed crystals attached thereto is immersed into the prepared starting material solution in a pressure vessel.

Then, the pressure vessel is placed in a drier, and thermal processing (hydrothermal synthesis) is performed for about 5 to 100 hours at 120 to 200 degrees C. for membrane formation of an aluminophosphate-based zeolite membrane on the surface of the support. The support with an aluminophosphate-based zeolite membrane formed thereon is removed from the starting material solution. There is no particular limitation on the pH of the residual starting material solution, but is preferably greater than or equal to 5 and less than or equal to 10.

Next, the support with an aluminophosphate-based zeolite membrane formed thereon is washed and dried at 80 to 100 degrees C.

Then, the support with an aluminophosphate-based zeolite membrane formed thereon is placed in an electric furnace, and heated to 400 to 700 degrees C. for 5 to 100 hours in air to thereby remove the structure-directing agent.

In the above manner, a support with an aluminophosphate-based zeolite membrane formed thereon can be prepared.

EXAMPLES

Examples of the present invention will be described below. However, the present invention is not limited to the example described below.

Example 1

In Example 1, a zeolite membrane having an AlPO-based ERI structure was prepared.

Firstly, 85% phosphoric acid as a phosphorous source, and N,N,N',N'-tetramethyl diaminohexane as a structure-directing agent were dissolved and mixed in pure water (ice water) at 0 degrees C. to thereby prepare a mixed solution having a temperature of 0 degrees C. and a pH of 7.3.

Next, aluminum isopropoxide as an aluminum source was added to the mixed solution, and the aluminum isopropoxide was completely dissolved by stirring and ultrasonic diffusion while cooling in cold water to thereby prepare a starting material solution having a composition of $1Al_2O_3:2.1P_2O_5: 2.8\ SDA:1340H_2O$. SDA is the structure-directing agent.

The starting material solution was placed into the pressure vessel containing the monolithic porous support that has been seeded with AlPO-based ERI crystals. Hydrothermal synthesis was performed for 40 hours at 160 degrees C. to thereby form a zeolite membrane having an AlPO-based ERI structure.

Next, after hydrothermal synthesis, the zeolite membrane having an AlPO-based ERI structure was sufficiently washed with pure water, and then completely dried at 90 degrees C. After drying, the $N_2$ permeation amount of the zeolite membrane having an AlPO-based ERI structure was measured and found to be less than or equal to 0.005 nmol/$m^2 \cdot s \cdot Pa$ and therefore the ERI membrane according to Example 1 was confirmed to have sufficient denseness to enable practical application.

Next, SDA was burned off through heat treatment of the zeolite membrane having an AlPO-based ERI structure for 50 hours at 450 degrees C. so that pores passed through the zeolite membrane.

Then, in a separation test using a mixed gas of $CO_2/CH_4$ (50:50) at 0.3 MPaG, the ERI membrane, of which both end portions of the porous support were sealed with a sealing material, demonstrated a $CO_2/CH_4$ permeance ratio of 504. Furthermore, in a separation test using a mixed gas of $N_2/CH_4$ (50:50) at 0.3 MPaG, the ERI membrane demonstrated a $N_2/CH_4$ permeance ratio of 8.6. Therefore, the ERI membrane according to Example 1 was confirmed to have sufficient separation performance to enable practical application.

Example 2

In Example 2, a zeolite membrane having an SAPO-based AFX structure was prepared.

Firstly, 85% phosphoric acid as a phosphorous source, and N,N,N',N'-tetramethyl diaminohexane as a structure-directing agent were dissolved and mixed in pure water (ice water) at 0 degrees C. to thereby prepare a mixed solution having a temperature of 0 degrees C. and a pH of 8.4.

Next, aluminum isopropoxide as an aluminum source is added to the mixed solution, and the aluminum isopropoxide is completely dissolved by stirring and ultrasonic diffusion while cooling in cold water. Then colloidal silica as a silicon source was added to thereby prepare a starting material solution having a composition of $0.75SiO_2:1Al_2O_3:1.25 P_2O_5:1.7\ SDA:350H_2O$.

The starting material solution was placed into the pressure vessel containing the monolithic porous support that has been seeded with SAPO-based AFX crystals and hydrothermal synthesis was performed for 50 hours at 170 degrees C. to thereby form a zeolite membrane having a SAPO-based AFX structure.

Next, after hydrothermal synthesis, the zeolite membrane having an SAPO-based AFX structure was sufficiently washed with pure water, and then completely dried at 90 degrees C. After drying, the $N_2$ permeation amount of the zeolite membrane having a SAPO-based AFX structure was measured and found to be 0.6 nmol/$m^2 \cdot s \cdot Pa$ and therefore the AFX membrane according to Example 2 was confirmed to have sufficient denseness to enable practical application.

Next, SDA was burned off through heat treatment of the zeolite membrane having a SAPO-based AFX structure for 20 hours at 500 degrees C. so that pores passed through the zeolite membrane.

Then, in a separation test using a mixed gas of $CO_2/CH_4$ (50:50) at 0.2 MPaG, the AFX membrane, of which both end portions of the porous support were sealed with a sealing material, demonstrated a $CO_2/CH_4$ permeance ratio of 159. Furthermore, in a separation test using a mixed gas of $N_2/CH_4$ (50:50) at 0.3 MPaG, the AFX membrane demonstrated a $N_2/CH_4$ permeance ratio of 6.3. Therefore, the AFX membrane according to Example 2 was confirmed to have sufficient separation performance to enable practical application.

Example 3

In Example 3, a zeolite membrane having an AlPO-based AEI structure was prepared.

Firstly, 85% phosphoric acid as a phosphorous source, and tetraethyl ammonium hydroxide as a structure-directing agent were dissolved and mixed in pure water (ice water) at 4 degrees C. to thereby prepare a mixed solution having a temperature of 4 degrees C. and a pH of 6.2.

Next, aluminum isopropoxide as an aluminum source was added to the mixed solution, the aluminum isopropoxide was completely dissolved by stirring and ultrasonic diffusion while cooling in cold water, and then phosphoric acid was added to thereby prepare a starting material solution having a composition of $1\ Al_2O_3:3.16\ P_2O_5:6.3\ SDA:850H_2O$.

Next, the starting material solution was placed into the pressure vessel containing the monolithic porous support that has been seeded with AlPO-based AEI crystals and hydrothermal synthesis was performed for 30 hours at 175 degrees C. to thereby form a zeolite membrane having an AlPO-based AEI structure.

Next, after hydrothermal synthesis, the zeolite membrane having an AlPO-based AEI structure was sufficiently washed with pure water, and then completely dried at 90 degrees C. After drying, the $N_2$ permeation amount of the zeolite membrane having an AlPO-based AEI structure was measured and found to be 0.04 nmol/$m^2 \cdot s \cdot Pa$ and therefore the AEI membrane according to Example 3 was confirmed to have sufficient denseness to enable practical application.

Next, SDA was burned off through heat treatment of the zeolite membrane having an AlPO-based AEI structure for 20 hours at 550 degrees C. so that pores passed through the zeolite membrane.

Then, in a separation test using a mixed gas of $CO_2/CH_4$ (50:50) at 0.2 MPaG, the AEI membrane, of which both end portions of the porous support were sealed with a sealing material, demonstrated a $CO_2/CH_4$ permeance ratio of 289. Furthermore, in a separation test using a mixed gas of $N_2/CH_4$ (50:50) at 0.3 MPaG, the AEI membrane demonstrated a $N_2/CH_4$ permeance ratio of 9.4. Therefore, the AEI membrane according to Example 3 was confirmed to have sufficient separation performance to enable practical application.

Comparative Example 1

In Comparative Example 1, with the exception of the step of mixing 85% phosphoric acid as a phosphorous source and aluminum isopropoxide as an aluminum source and then adding N,N,N',N'-tetramethyl diaminohexane as a structure-directing agent at room temperature, a starting material solution was prepared using the same steps of Example 1. The composition of the starting material solution in Comparative Example 1 was the same as that in Example 1.

Next, the starting material solution was placed into the pressure vessel containing the monolithic porous support that has been seeded with AlPO-based ERI crystals and hydrothermal synthesis was performed for 30 hours, 40 hours and 45 hours at 170 degrees C. to thereby form a zeolite membrane having an AlPO-based ERI structure.

Next, after hydrothermal synthesis, the zeolite membrane having an AlPO-based ERI structure was sufficiently washed with pure water, and then completely dried at 90 degrees C. After drying, the $N_2$ permeation amount of the zeolite membrane having an AlPO-based ERI structure was measured and all configurations that resulted from any of the synthesis times above were found to have an $N_2$ permeation amount in the range of 500 to 5000 nmol/m$^2$·s·Pa. Therefore, it was shown that membrane formation of a dense zeolite membrane having an AlPO-based ERI structure was not possible.

Comparative Example 2

In Comparative Example 2, with the exception of the step of mixing 85% phosphoric acid as a phosphorous source and aluminum isopropoxide as an aluminum source and then adding N,N,N',N'-tetramethyl diaminohexane as a structure-directing agent and colloidal silica at room temperature, a starting material solution was prepared using the same steps of Example 2. The composition of the starting material solution in Comparative Example 2 was the same as that in Example 2.

Next, the starting material solution was placed into the pressure vessel containing the monolithic porous support that has been seeded with SAPO-based AFX crystals and hydrothermal synthesis was performed for 30 hours, 40 hours and 50 hours at 170 degrees C. to thereby form a zeolite membrane having a SAPO-based AFX structure.

Next, after hydrothermal synthesis, the zeolite membrane having a SAPO-based AFX structure was sufficiently washed with pure water, and then completely dried at 90 degrees C. After drying, the $N_2$ permeation amount of the zeolite membrane having a SAPO-based AFX structure was measured and all configurations that resulted from any of the synthesis times above were found to have an $N_2$ permeation amount in the range of 3000 to 10000 nmol/m$^2$·s·Pa. Therefore, it was shown that membrane formation of a dense zeolite membrane having a SAPO-based AFX structure was not possible.

Comparative Example 3

In Comparative Example 3, with the exception of the step of mixing and dissolving aluminum isopropoxide as an aluminum source in an aqueous solution of tetraethyl ammonium hydroxide as a structure-directing agent, and then adding 85% phosphoric acid at room temperature, a starting material solution was prepared using the same steps of Example 3. When adding the phosphoric acid, partial gelation was observed. The composition of the starting material solution in Comparative Example 3 was the same as that in Example 3.

Next, the starting material solution was placed into the pressure vessel containing the monolithic porous support that had been seeded with AlPO-based AEI crystals and hydrothermal synthesis was performed for 30 hours at 175 degrees C. to thereby form a zeolite membrane having an AlPO-based AEI structure.

Next, after hydrothermal synthesis, the zeolite membrane having an AlPO-based AEI structure was sufficiently washed with pure water, and then completely dried at 90 degrees C. After drying, the $N_2$ permeation amount of the zeolite membrane having an AlPO-based AEI structure was measured and was found to be in the range of 608 nmol/m$^2$·s·Pa. Therefore, it was shown that membrane formation of a dense zeolite membrane having an AlPO-based AEI structure was not possible.

Observations

As described above, Examples 1 to 3 in which a starting material solution was formed by adding an aluminum source to a neutralized mixed solution of an acidic phosphorous source and an alkali source suppressed production of low solubility aluminum phosphate that results from a reaction between the aluminum source and the phosphorous source. Therefore, membrane formation characteristics of an aluminophosphate-based zeolite membrane could be enhanced. As a result, a dense aluminophosphate-based zeolite membrane was obtained that exhibited height separation performance.

On the other hand, Comparative Examples 1 and 2 in which a starting material solution was formed by mixing an alkali source after mixing an acidic phosphorous source and an aluminum source produced aluminum phosphate as a result of the prior reaction between the aluminum source and the phosphorous source and therefore the membrane formation characteristics of the aluminophosphate-based zeolite membrane were poor. In the same manner, Comparative Example 3 in which a starting material solution was formed by mixing an acidic phosphorous source after mixing an alkali structure-directing agent and an aluminum source produced partial gelation of the starting material solution during neutralization. As a result, it was not possible to obtain a dense aluminophosphate-based zeolite membrane.

In the above manner, it was confirmed that the membrane formation characteristics of an aluminophosphate-based zeolite membrane were improved by preparing the starting material solution by adding the aluminum source to a neutralized mixed solution of an acidic phosphorous source and an alkali source.

The invention claimed is:

1. A method of synthesis for an aluminophosphate-based zeolite membrane comprising:
   preparing a mixed solution with a pH greater than or equal to 6 and less than or equal to 9 by mixing an acidic phosphorous source with an alkali source;
   preparing a starting material solution by adding and mixing an aluminum source to the prepared mixed solution; and
   synthesizing an aluminophosphate-based zeolite membrane by hydrothermally synthesizing the starting material solution.

2. The method of synthesis for an aluminophosphate-based zeolite membrane according to claim 1,
   wherein in the step of preparing the starting material solution, the mixed solution is configured to be less than or equal to a temperature that enables suppression of a reaction of the aluminum source with the phosphorous source in the mixed solution.

3. The method of synthesis for an aluminophosphate-based zeolite membrane according to claim 2, wherein in the step of preparing the starting material solution, the mixed solution has a temperature of less than or equal to 40 degrees C.

4. The method of synthesis for an aluminophosphate-based zeolite membrane according to claim 2,
wherein in the step of preparing the starting material solution, the mixed solution has a temperature of less than or equal to 25 degrees C.

5. The method of synthesis for an aluminophosphate-based zeolite membrane according to claim 2,
wherein in the step of preparing the starting material solution, the mixed solution has a temperature of less than or equal to 10 degrees C.

6. The method of synthesis for an aluminophosphate-based zeolite membrane according to claim 2,
wherein in the step of preparing the starting material solution, the mixed solution has a temperature of less than or equal to 5 degrees C.

7. The method of synthesis for an aluminophosphate-based zeolite membrane according to claim 1,
wherein in the step of preparing the mixed solution, the alkali source is an organic amine-type structure-directing agent.

8. The method of synthesis for an aluminophosphate-based zeolite membrane according to claim 7,
wherein the aluminum source is aluminum alkoxide or an alumina sol.

9. The method of synthesis for an aluminophosphate-based zeolite membrane according to claim 1,
wherein the aluminophosphate-based zeolite membrane is configured by an AlPO-based or SAPO-based zeolite.

10. The method of synthesis for an aluminophosphate-based zeolite membrane according to claim 9,
wherein the aluminophosphate-based zeolite membrane is configured by a zeolite that has pores that are formed from an oxygen 8-membered ring.

11. The method of synthesis for an aluminophosphate-based zeolite membrane according to claim 1,
wherein a molar ratio of $H_2O$ to T atoms, which are atoms positioned at the center of the oxygen tetrahedron that forms the aluminophosphate-based zeolite membrane, in the starting material solution is greater than or equal to 30.

* * * * *